United States Patent [19]

Jackson et al.

[11] Patent Number: 4,914,866

[45] Date of Patent: Apr. 10, 1990

[54] APPARATUS FOR ADJUSTING OPTICAL FIBER CONNECTOR COMPONENTS

[75] Inventors: Kenneth W. Jackson, Lawrenceville; Norman R. Lampert, Norcross; Harold F. Muth, Jr., Roswell, all of Ga.

[73] Assignees: American Telephone and Telegraph Co., Murray Hill; AT&T Technologies, Inc., Berkeley Heights, both of N.J.

[21] Appl. No.: 303,110

[22] Filed: Jan. 27, 1989

Related U.S. Application Data

[60] Continuation-in-part of Ser. No. 146,067, Jan. 20, 1988, abandoned, which is a division of Ser. No. 929,444, Nov. 12, 1986, Pat. No. 4,738,055, which is a continuation of Ser. No. 676,113, Nov. 29, 1984, abandoned.

[51] Int. Cl.$^4$ ............................................. B24B 15/00
[52] U.S. Cl. ................................... 51/72 R; 51/73 R; 51/206 R; 51/26
[58] Field of Search ............... 51/26, 27, 28, 29, 72 R, 51/73 R, 98 R, 105 R, 105 VG, 204, 205 R, 206 R, 241 VS, 263, 267, 281 R, 283 R, 290

[56] References Cited

U.S. PATENT DOCUMENTS

| | | | |
|---|---|---|---|
| 1,562,587 | 11/1925 | Ranagan | 51/73 R X |
| 1,923,611 | 8/1933 | Bozarth | 51/73 R |
| 2,287,697 | 6/1942 | Miller | 51/98 R |
| 2,427,849 | 9/1947 | Garwood . | |
| 2,648,179 | 8/1953 | Manes et al. | 51/283 |
| 2,797,536 | 7/1957 | Shesler | 51/241 VS X |
| 3,168,799 | 2/1965 | Johnson | 51/205 R X |
| 3,335,526 | 8/1967 | Weiss | 51/73 R |
| 4,016,855 | 4/1977 | Mimata . | |
| 4,087,158 | 5/1978 | Lewis et al. . | |
| 4,107,242 | 8/1978 | Runge . | |
| 4,186,998 | 2/1980 | Holzman . | |
| 4,240,695 | 12/1980 | Evans . | |
| 4,339,091 | 6/1983 | Lidholt et al. . | |
| 4,384,431 | 5/1983 | Jackson . | |
| 4,458,983 | 7/1984 | Roberts . | |

FOREIGN PATENT DOCUMENTS

127337 10/1979 Japan .

OTHER PUBLICATIONS

W. C. Young et al., article, "Design and Performance of the Biconic Connector Used in the FT3 Lightwave Systems", 1981 International Wire and Cable Proceedings, 1981, pp. 411–418.
Balliet, IBM Technical Disclosure Bulletin, Aug. 1981, vol. 24, No. 3, pp. 1622, 1623.
Balliet, IBM Technical Disclosure Bulletin, Sep. 1984, vol. 27, No. 4B, pp. 2427, 2428.
E. Bright Wilson, Jr., *An Introduction to Scientific Research*, p. 109.

*Primary Examiner*—Robert P. Olszewski
*Attorney, Agent, or Firm*—Edward Sommers

[57] ABSTRACT

An alignment sleeve (66) for holding two conically shaped portions (30—30) of plugs (24—24) each of which terminates an optical fiber (25) includes two conically shaped cavities (68, 70) communicating through a common minimal diameter plane (72). After the sleeve has been molded, a tool (100) faced with an abrasive material is inserted into each cavity of the sleeve and turned rotatably while a force is applied in a direction parallel to the longitudinal axis of the tool. This causes material to be removed from the walls defining the cavities so that when the two plugs are inserted into the cavities, the axes of the fibers will be aligned coaxially and the end faces of the fibers will have a predetermined separation. The apparatus of this invention also may be used to adjust a length measurement of plugs. This is accomplished by inserting a plug into a conically shaped cavity of a tool. A wall which defines the cavity of the tool is faced with an abrasive material which upon turning the plug abrades the plug to thereby increase the distance from a reference circumference of the plug to a pedestal (36) in which the free end of the optical fiber terminates.

6 Claims, 6 Drawing Sheets

Fig_7

Fig_3

Fig_2

APPARATUS FOR ADJUSTING OPTICAL FIBER CONNECTOR COMPONENTS

This application is a continuation-in-part of application Ser. No. 146,067, filed Jan. 20, 1988 now abandoned which is a divisional application under 37 CFR 1.60 of prior application Ser. No. 929,444 which was filed on 11/12/86 now U.S. Pat. No. 4,738,055 which is a continuation of application Ser. No. 676,113 filed 11/29/84 now abandoned.

TECHNICAL FIELD

This invention relates to apparatus for adjusting optical fiber connector components and products produced thereby. More particularly, this invention relates to post molding apparatus for adjusting an alignment sleeve and/or optical fiber terminating plugs so that when the plugs are mounted in the sleeve, the fibers are aligned and have a predetermined end separation.

BACKGROUND OF THE INVENTION

The use of optical fibers in communications is growing at an unprecedented rate. Low loss optical fibers which are produced by any one of several techniques may be assembled into ribbons which are then assembled into cables, or stranded into cables, or they may be enclosed singularly in a jacket and used in various ways in a central office, for example.

In order to assure that the low loss fibers which are produced today are not diminished in their effectiveness in systems, the fibers must be connected through intermateable connectors which preserve those low losses. For fiber ribbons, connectors comprise grooved chips which hold a plurality of fibers of one ribbon in alignment with fibers of another ribbon. Such a connector is shown for example in U.S. Pat. No. 3,864,018 which issued on Feb. 4, 1975 in the name of C. M. Miller.

For single fiber cables, connections may be made through a connector which is referred to as a biconic connector. See U.S. Pat. No. 4,107,242 which issued on Aug. 15, 1978 in the name of P. K. Runge. That connector includes a housing in which is mounted a biconic alignment sleeve. The sleeve includes two truncated, conically shaped cavities which communicate with each other through a common plane which has the least diameter of each cavity. Each of two fibers to be connected is terminated with a plug comprising a primary pedestal or truncated, conically shaped end which is adapted to be received in one of the cavities of the sleeve. At least portions of the conically shaped surfaces of the plug and of the sleeve serve as alignment surfaces and are intended to be conformable. The fiber extends through the plug and has an end which terminates in a secondary pedestal of the plug. A cylindrically shaped portion of the plug is connected to the truncated end. The plug is urged into seated engagement with the wall defining the cavity in which it is received.

Minimal loss between the connected fibers is achieved when the fibers which are terminated by the plugs are aligned coaxially and when the fiber end faces, each of which is planar, contact in a common plane. Considering the size of the fibers, for example one with a core diameter of 8 microns and a cladding diameter of 125 microns, the task of providing conformable, conical plug and sleeve surfaces in order to meet alignment and end separation requirements is a formidable one. Further, this task is made difficult by the somewhat imprecise surface tolerances which are achieved when molding the alignment sleeve.

The alignment sleeves as molded are checked for accuracy by inserting a gauging ball into each cavity and measuring the distance between reference circumferences of the walls of opposing cavities which are engaged by the balls. If the distance is too long, the plugs may seat within the cavities, but the end separation of the fiber end faces is too great. On the other hand, if the distance is too short, the secondary pedestals touch, but there is insufficient contact between the alignment surfaces. Further, if the fiber end faces contact each other prior to seating the conformable portions of the alignment surfaces of the plugs, the fibers within the plugs may become misaligned or the fiber end faces may become damaged. It has been very difficult to obtain simultaneously seating of the plugs in the sleeve cavities and end face contact of the fibers. In the past, an undesirably high number of sleeves have exhibited distances which were not within acceptable tolerance levels.

A problem also exists with respect to a so-called taper length of the plug. The plug taper length is defined as that distance from a reference circumference on the plug boundary to the terminated fiber end face which is the end face of the secondary pedestal. The initial adjustment of the taper length is accomplished with methods and apparatus disclosed in U.S. Pat. No. 4,384,431 which issued on May 24, 1983 in the name of K. W. Jackson. However, if the taper length is too long, the secondary pedestals may touch but there is no contact between the conforming surfaces. On the other hand, if the taper length is too short, the plugs seat within the cavities of the sleeve, but the end faces of the fibers are spaced apart by too great a distance.

The prior art does not provide an altogether satisfactory solution. For example, in one patent, a quantity of index matching optical fluid is positioned within the cavities of the sleeve, after which the fibers are pushed into the cavities until their end faces engage the conically shaped walls to align the fibers and to place their end faces in close adjacency. The optical fluid helps to reduce the transmission loss notwithstanding the fact that the end faces are not contacting. Although this arrangement may provide an adequate connection, it depends on an additional medium which may introduce contaminants at the fiber junction.

Seemingly, the prior art is devoid of a simple solution to the problem of providing production sleeves and plugs at a relatively high yield for biconic connectors which may be used for multi or single mode lightguide fibers. Desirably, the solution does not involve additional elements or time in the conneciton procedures, but instead involves an adjustment of the high production yield, molded sleeves and plugs to achieve precision without the need of a skilled machinist.

SUMMARY OF THE INVENTION

The foregoing problems have been solved by the apparatus of this invention. A method is provided to adjust associated, conically shaped alignment surfaces of a plug, which terminates an optical fiber, and of a sleeve, which is adapted to receive the plug, to cause an end face of the fiber to occupy a predetermined position when the plug is received in the sleeve. One of the associated alignment surfaces of the plug and the sleeve, and a tool are juxtaposed. An abrasive material is caused to be interposed between the tool and the one alignment surface and in contact with the one alignment surface. Relative motion is caused between the tool and the one surface to cause the abrasive material to abrade the one surface to adjust the distance between a reference circumference of the one surface and a reference plane and cause the end face of the fiber to occupy a predetermined position with respect to the reference plane when the plug is received in the sleeve.

In another embodiment, associated alignment surfaces are used to cause a two cavity sleeve to hold the plugs of two fibers aligned with each other and to cause their end separation to be a predetermined amount. One of the associated conically shaped surfaces of a first truncated conically shaped plug which terminates an optical fiber and of a wall which defines a conically shaped cavity of the sleeve destined to receive the first plug is abraded by causing relative motion between the one surface and a tool which is provided with an abrasive material. Also, one of associated conically shaped surfaces of a second truncated conically shaped plug which terminates an optical fiber and of a wall which defines the other conically shaped cavity of the sleeve is abraded by causing relative motion between it and the tool. The abrading steps cause the distance between a reference circumference of one of the alignment surfaces of the first plug and associated cavity wall and a reference circumference of one of the alignment surfaces of the second plug and associated cavity wall to be a predetermined value. This results in the first and second plugs simultaneously being aligned coaxially in the sleeve and the end faces of the fibers terminated in the plugs having a predetermined separation.

In a preferred embodiment, the wall which defines each of the sleeve cavities is abraded by a tool having a truncated conically shaped end portion which is faced with an abrasive material and which is provided with a lubricant. When the tool is inserted into each cavity, its end engages the wall of the cavity before reaching a transverse centerline of the sleeve. Then the tool is turned rotatably while forces are applied to the tool in a direction parallel to a longitudinal axis of the sleeve. The tool is turned rotatably about an axis which is substantially coincident with the longitudinal axis of the sleeve.

The invention includes an apparatus for adjusting alignment surfaces on the fiber terminating plugs and on the sleeve to cause each sleeve to hold two plugs and the fibers aligned with each other and to cause their end separation to be a predetermined amount. In a preferred embodiment, the apparatus includes tool means including a conically shaped truncated surface which is provided with an abrasive material for abrading one of associated conically shaped surfaces of a first truncated conically shaped plug which terminates an optical fiber and of a wall which defines a conically shaped cavity of a sleeve destined to receive the first plug. Also, the tool means is capable of abrading one of the associated conically shaped surfaces of a second truncated conically shaped plug which terminates an optical fiber and of a wall which defines the other conically shaped cavity of the sleeve. As a result, the distance between a reference circumference of one of the alignment surfaces of the first plug and sleeve to a reference circumference of one of the alignment surfaces of the second plug and sleeve is a predetermined value. The tool means is turned by hand or by an apparatus which includes a flexible or self-aligning shaft about a longitudinal axis of the sleeve to cause the tool to remove material from one of each pair of associated surfaces of the plugs and the sleeve.

BRIEF DESCRIPTION OF THE DRAWINGS

Other objects and features of the present invention will be more readily understood from the following detailed description of specific embodiments thereof when read in conjunction with the accompanying drawings, in which.

DETAILED DESCRIPTION

Figures 1, 1A, 1B:
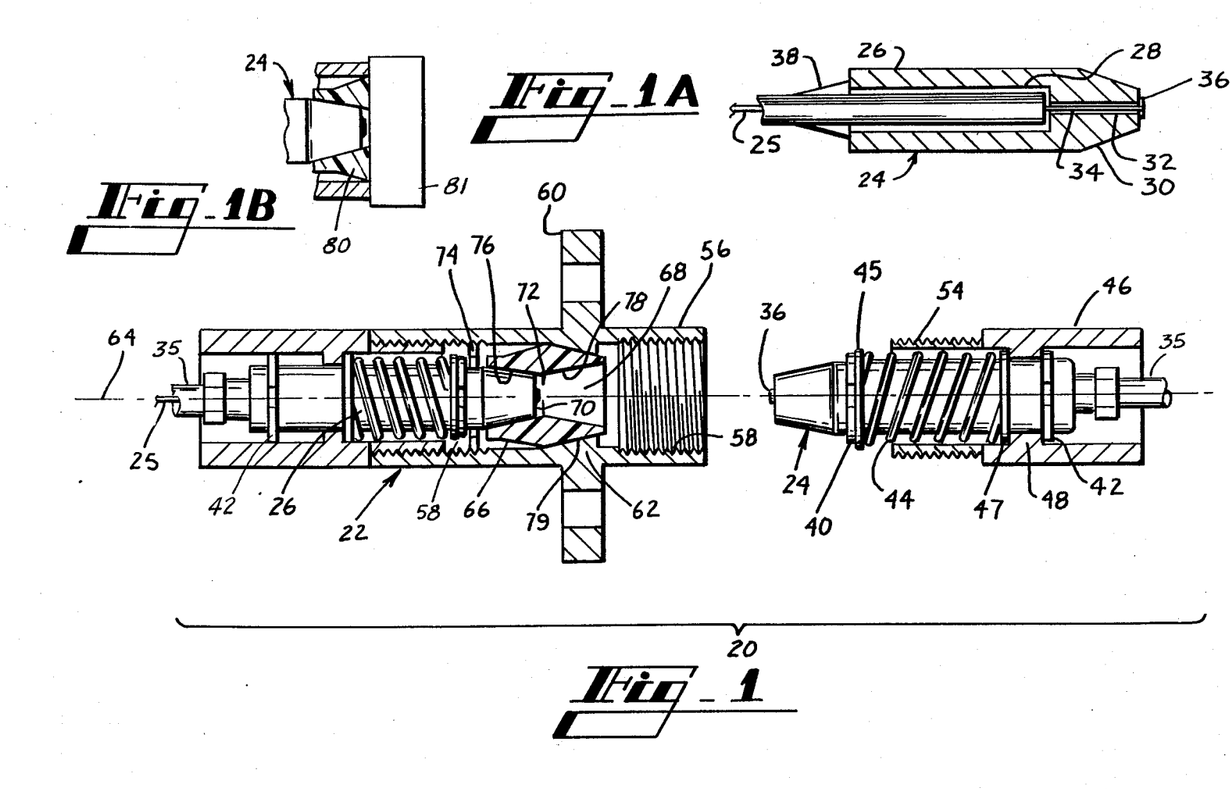
FIG. 1 shows an elevational view of a biconic connector for lightguide fiber cables which includes an alignment sleeve and two plugs each of which terminates an optical fiber.
FIG. 1A is a detail view of a portion of a biconic connector plug.
FIG. 1B is a detail view of a single cavity alignment sleeve of a connector and a plug which terminates an optical fiber.

Referring now to FIG. 1, there is shown a biconic connector designated generally by the numeral 20. The biconic connector 20 includes a housing 22 for receiving two plugs 24—24 each of which terminates a lightguide or optical fiber 25. Both the plug and the housing are made of a crushed silica, transfer molding grade epoxy composition, for example. As can be seen in FIG. 1A, each plug 24 includes a cylindrical portion 26 which includes a bore 28, and an end portion 30. The end portion 30 has a truncated conical shape and includes a passageway 32 that communicates with the bore 28.

A coated single optical fiber 25 which has been jacketed with a plastic material such as polyvinyl chloride to form a cable 35 is terminated with the plug 24. The jacketing material and the coating are removed from an end portion 34 of the single fiber cable. The cable is inserted into the bore 28 until the bared end portion 34 is received in the passageway 32 with an end portion of the fiber 25 extending into a secondary pedestal 36. An end face of the fiber 25 is coincident with the end face of the secondary pedestal 36. The cable at its exit from the bore 28 is provided with a strain relief member 38.

Each plug 24 is provided with retaining rings 40 and 42. The retaining ring 40 abuts a collar 45 which is fixedly located about the plug 24. A compression spring 44 is disposed about the cylindrical portion 26 of the plug between the collar 45 and a collar 47. The plug 24 is positioned in an end portion of a threaded holder 46 with the collar 47 in engagement with an annular lip 48 interior to the holder. The retaining ring 42 is disposed about the cylindrical portion 26 of the plug 24 on the other side of the lip 48 to hold the plug within the holder. A threaded portion 54 extends from the holder 46 and the single fiber cable 35 extends in the other direction from within the holder 46.

A center portion 56 of the housing 22 is adapted to receive the two threaded plug holders and two plugs 24—24. The center portion 56 includes two opposed internally threaded cavities 58—58 and a flange 60 adapted to be mounted to a supporting surface. The flange 60 is aligned with an internally disposed annular collar 62 which extends toward a longitudinal axis 64 of the housing. The center portion 56 of the housing also is adapted to receive an alignment sleeve 66 which comprises two opposed truncated, conically shaped cavities 68 and 70 which meet at a common plane 72.

The alignment sleeve 66 is disposed within the portion 56 of the housing so that when the plugs 24—24 are mounted in the holders 46—46 and the threaded portions 54—54 turned into the cavities 58—58, the ends 30—30 of the plugs are received in the cavities 68 and 70 with the secondary pedestals in the vicinity of the common plane 72. Also, as the threded portions 54—54 are turned into the housing portion 56, the plug portions 26—26 are moved through the openings defined by the lips 48—48 to move the retaining rings 42—42 out of engagement with the lips (see left side of FIG. 1). The retaining ring 40 of the left plug as viewed in FIG. 1 is adjacent to a sleeve retaining ring 74. The spring 44 causes the plug end portion 30 to be seated firmly in engagement with a wall 76 of the alignment sleeve. The ring 74 is threadably secured inside the housing portion 56 and although not necessarily in engagement with the sleeve, it prevents the sleeve from being removed inadvertently from the housing. Further, the right plug end 30 as viewed in FIG. 1 is moved into the cavity 68 of the sleeve 66 and contacts a wall 78. The sleeve 66 may float within an opening 79 in the collar 62 to facilitate alignment of the two plugs 24—24.

In another embodiment, a sleeve 80 (see FIG. 1B) which resembles half of a sleeve 66 is used to connect a plug 24 to a device 81. For that arrangement, the end of the optical fiber must be aligned coaxially with the sleeve 80 and with a connective portion of the device 81 and have a predetermined separation with respect thereto.

Ideally, to achieve minimum loss, the plugs 24—24 disposed within the sleeve 66 should have their longitudinal axes aligned and end faces of the fibers within the secondary pedestals 36—36 contacting each other or at worst spaced apart a slight predetermined distance. The outer surface of the conical end 30 of each plug 24 and the surfaces of the walls 76 and 78 of the sleeve cavities are associated alignment surfaces which are intended to cause the desired positioning of the pedestals 36—36 when the conical ends of the plugs are received in the sleeve 66. The problem is that the alignment sleeves 66—66 as provided by transfer molding apparatus, for example, are not made within tolerances which result in the plugs 24—24 being aligned and having the required end separation in a considerable percent of the product.

In order to achieve the specified requirements, the sum of the distances from the common plane 72 to a reference circumference of the cavity 70 and a reference circumference of the cavity 68 must be in a predetermined range. Likewise a so-called taper length of each plug must be a predetermined distance. As will be recalled, the plug taper length is defined as the distance from a reference circumference on the plug boundary to the end face of the secondary pedestal 36. Testing procedures have been developed for determining the taper length of a plug for a biconic connector and for checking the distance between the reference circumferences of the sleeve.

Figures 2, 3, 7:
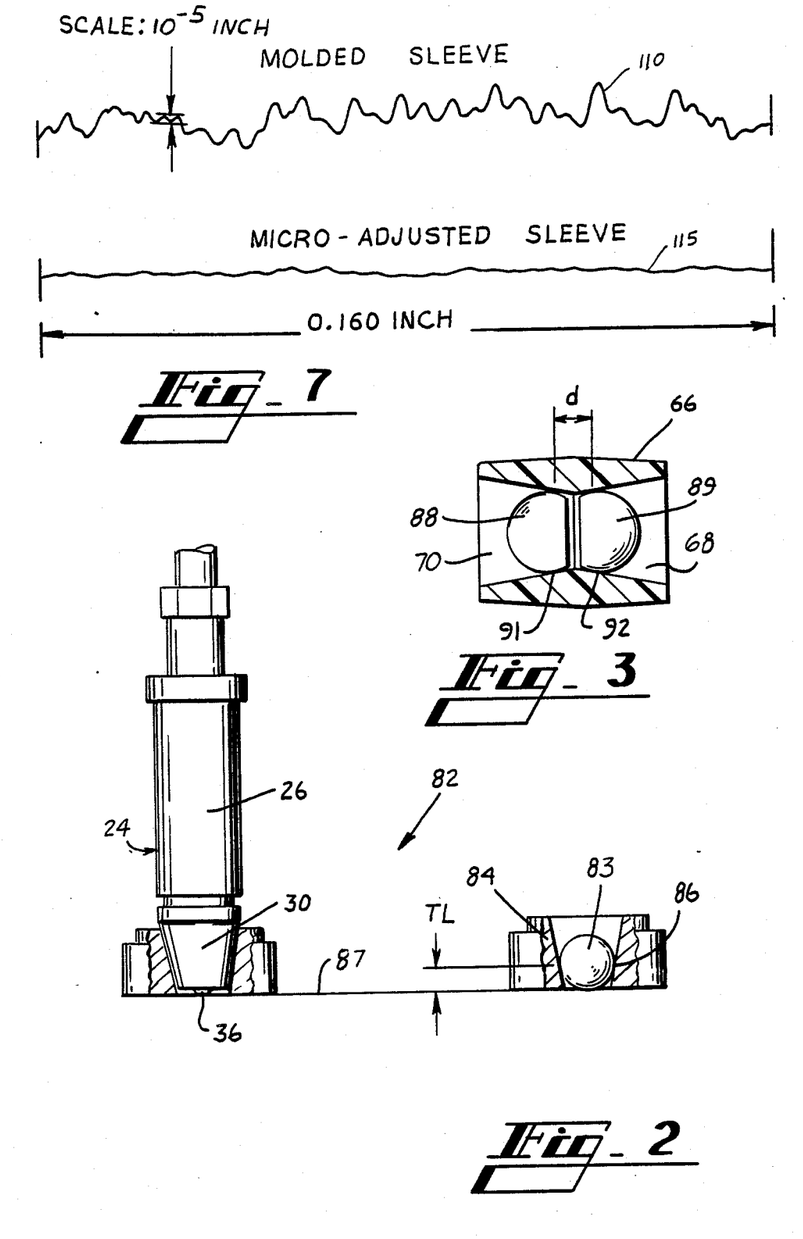
FIG. 2 shows an arrangement for gauging the seating of a plug in an alignment sleeve.
FIG. 3 is an elevational view of an alignment sleeve with gauging balls in position to indicate end face separation.
FIG. 7 is a schematic view which shows longitudinal surface profiles of a biconic sleeve surface before and after the application of the adjustment methods of this invention.

Referring now to FIG. 2, there is shown an apparatus 82 which is used to measure the plug taper length. When a metallic gauging ball 83 is inserted into a metallic gauging sleeve 84, the ball projects from a reference circumference of the sleeve at a location 86 a predetermined distance TL, which is referred to as the taper length and which may be monitored. The reference circumference is the circumference of the location where the ball 83 contacts the sleeve cavity wall. When a plug 24 is inserted into the gauging sleeve 84, the end of its secondary pedestal 36 may be above, at, or below a plane 87 through the end of the gauging ball. This determination is indicative of whether or not the plug taper length is too short, acceptable or too long.

A similar test also has been developed for checking alignment sleeves to determine whether the distance between reference circumferences of the sleeve is within a predetermined tolerance. This is accomplished as seen in FIG. 3 by inserting gauging balls 88 and 89, which are made of a suitable material, such as metal or ceramic material, for example, into each cavity of a sleeve 66. Then a distance "d" between the reference circumferences 91 and 92 where the balls 88 and 89 engage the walls of the cavities 70 and 68 of the sleeve 66 is measured and compared to a standard value. It has been found that an unacceptable number of the sleeves 66—66, as molded, have distances between reference circumferences which are not within the tolerance range. As a result, the gauging balls 88 and 89 generally are spaced farther apart or closer together than required which results in plug ends, and therefore fiber end faces, being spaced too far apart or the fiber ends perhaps being misaligned or both.

As should be apparent, the problem of end face separation and alignment in biconic connectors is twofold. First, the sleeve cavities 68 and 70 themselves must meet precise configurations. Secondly, the plugs 24—24 each must have a taper length which is a predetermined value. The methods of this invention are used to solve both problems and provide plugs and sleeves which mate in a manner to provide a desired fiber end face separation and fiber alignment. This is accomplished by causing at least those portions of the outer surfaces of the conical ends 30—30 of the plugs 24—24 and the walls 76 and 78 of the sleeves 66—66 which are adjacent to the common plane 72 to be substantially conformable. It should be clear that those sleeves, as molded, in which the gauging balls are too close together are not able to be adjusted.

Figure 4:
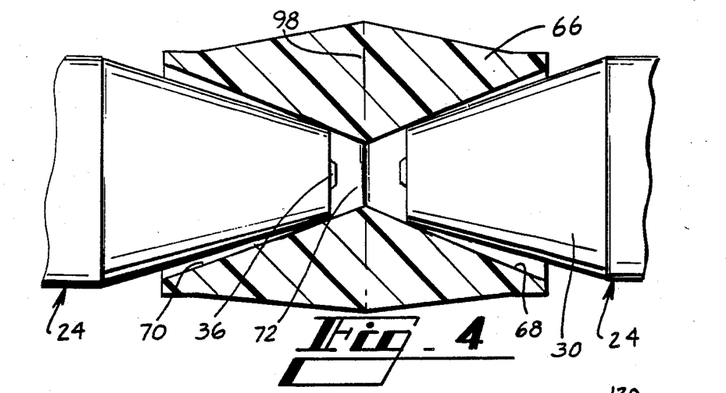
FIG. 4 is a schematic elevational view which shows plugs inserted into an alignment sleeve as molded.

An enlarged view of an alignment sleeve, as molded, with two plugs 24—24 received therein is shown in FIG. 4. The sleeve 66 is molded and the plugs are molded so that when the plug 24 is inserted into the sleeve 66, it engages the cavity wall to one side of the common plane 72 as is shown in an exaggerated fashion in FIG. 4. The common plane 72, as will be recalled, coincides with a transverse axis 98 through the center of the sleeve 66. As can be seen, the end faces of the pedestals 36—36 and hence the end faces of the lightguide fibers which are terminated by the plugs 24—24 are spaced apart, farther in fact than allowed. Also, the surfaces of the plugs and sleeves have different included angles which are exaggerated in FIG. 4 for purposes of clarity.

Figures 5, 10:
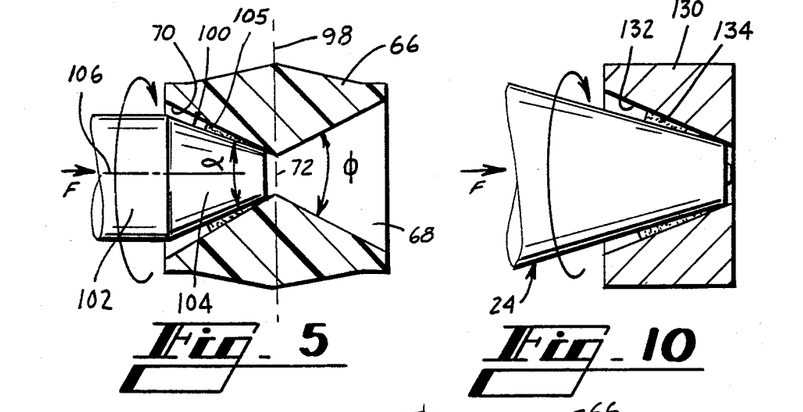
FIG. 5 is a view of a tool which is used to adjust a sleeve.
FIG. 10 is a schematic elevational view which shows another tool such as a sleeve which is used to adjust a plug.

Referring now to FIG. 5, there is shown schematically an apparatus for providing post molding adjustments to a sleeve 66. The apparatus includes a tool 100. The tool 100 includes a tapered portion 104. The tapered portion 104 has a precisely machined configuration which is a truncated conical shape. Further, the tool 100 is faced with an abrasive material 105, such as, for example, diamond particles in a nickel matrix, which is plated to the surface of a tapered portion of the tool.

The tool 100 is adapted to be turned rotatably by a cylindrical portion 102 about a longitudinal axis 106. In a preferred embodiment, the axis 106 is not fixed by mounting the tool. Rather the tool 100 and portion 102 are hand held and free to float to find a center of rotation, preferably at the center of a plane slightly to one side of the common plane 72. If mounted about a fixed axis of rotation, any error could be multiplied unless the axis of rotation is prealigned with the center of the sleeve in the vicinity of the common plane 72. In the alternative, the tool could be mounted on a flexible spindle instead of being hand held.

The tool 100 has a particular configuration. For example, the tapered portion 104 has a minimum diameter which is slightly greater than the diameter of the sleeve 66 along the common plane 72. As a result, the tool 100 engages a wall of each cavity to one side of the common plane 72. Because of molding flash, the circumference of the sleeve cavities along the common plane is not well defined. If the end of the tool 100 were bottomed out at the minimum diameter, its axis of rotation would be affected adversely.

This is arranged so that when the tool is rotated, its axis of rotation 106 is coincident with that of the cavity into which the tool has been inserted near the center of the common plane 72 of the sleeve. This is important inasmuch as this is the region where the fiber end faces either touch or are spaced apart. If the axis of rotation were to be determined at a distance spaced from the center of the sleeve 66, any error in finishing or molding could be propagated and multiplied undesirably as the common plane 72 is reached, which would affect adversely the critical region.

Another important parameter with respect to the tool is an angle, $\alpha$, which is the included angle between the line of revolution of the conically shaped end at diametrically opposite positions. Typically, the sleeve 66 as molded has an included angle $\phi$ which is in the range of about 20°. The tool end has an included angle which is slightly less and which is in the low end of the range for that of the cavity.

In operation, a sleeve which intentionally has been molded with a distance "d" slightly longer than desired is held in a support (not shown). The tool 100 is coated with a lubricant such as alcohol, for example, and inserted into each end of the sleeve 66 until it bottoms out in the vicinity of the common plane 72 (see FIG. 5). Relative motion is caused to occur between the tool 100 and the sleeve 66 by turning the portion 102 of the tool, by turning the sleeve 66, or by turning both. In a preferred embodiment, the tool 100 is caused to be turned rotatably about the axis 106 of the sleeve 66 to cause the abrasive material to engage and remove material from the wall of the sleeve which defines each cavity. If the tool 100 is hand held, it is turned in opposite rotary directions by finger motion while a force, F, is applied in a direction parallel to the axis 106 (see FIG. 5).

Figure 6:
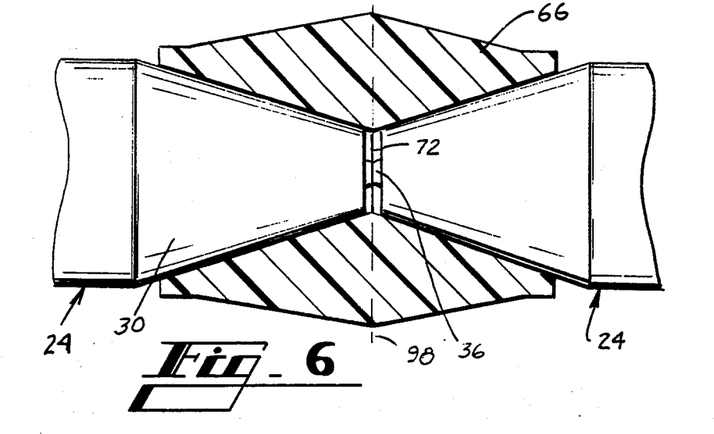
FIG. 6 is a schematic elevational view of the plugs and the sleeve which are shown in FIG. 4 after the sleeve has been adjusted.

Because material is removed from each cavity wall, the gauging balls 88 and 89 when inserted, will become disposed closer together. Material is removed from the walls defining the cavities until the alignment surfaces of the plugs 24—24 and of the sleeve 66 are substantially conformable (see FIG. 6), at least adjacent to the common plane 72. The relative motion is caused to occur until the distance between a reference circumference of the cavity 68 to a reference circumference of the cavity 70 is within a predetermined range. As will be recalled, the reference circumference of each cavity is that circumference along which the cavity wall is contacted by a gauging ball. For a single cavity sleeve (see FIG. 1B) such as might be used to connect a cable to a device, for example, the adjustment is carried out until the distance from a reference circumference to a reference plane, which may be the plane 72, is a predetermined value. This insures a desired simultaneous fiber end face separation and centering registration. Also, it should be pointed out that this technique has increased substantially the production yield of acceptable sleeves.

Afterwards, a lint-free cloth is used to apply alcohol to the cavity surfaces to clean them. Then the cavity surfaces are dried with a jet stream of air and with the same lint-free cloth. In a next step, the cavity walls of the sleeve are polished with an antistatic, dust repellent material. Then it is cleaned, air-dried, cleaned with alcohol, redried and cleaned with a lint-free cloth.

It should be realized that the tool 100 could comprise a plug 24 which is provided with an abrasive material. Also, it should be apparent that a tool could be juxtaposed to the conical surface of the cavity 68 or 70 and an abrasive medium interposed between the tool and the cavity surface and in contact with the cavity surface. The relative motion causes the distance between the two reference circumferences to decrease. A suitable abrasive medium which may be interposed between the surfaces is an aluminum oxide in a water-alcohol carrier, for example.

Further, the same tool 100 is used to adjust both cavities. This results in the cavities 68 and 70 being matched, which is not necessarily true following molding.

Going now to FIG. 7, there is shown a profile 110 of a sleeve 66 after it is molded, then cured, and a profile 115 after it has been adjusted by the conformable lapping technique of this invention. Each profile is taken over the length of the tapered portion of the sleeve. As can be seen in FIG. 7, the conformable lapping technique produces a profile 115 which is substantially smoother and more straight than that of the connector component in the as molded condition.

Figure 8:
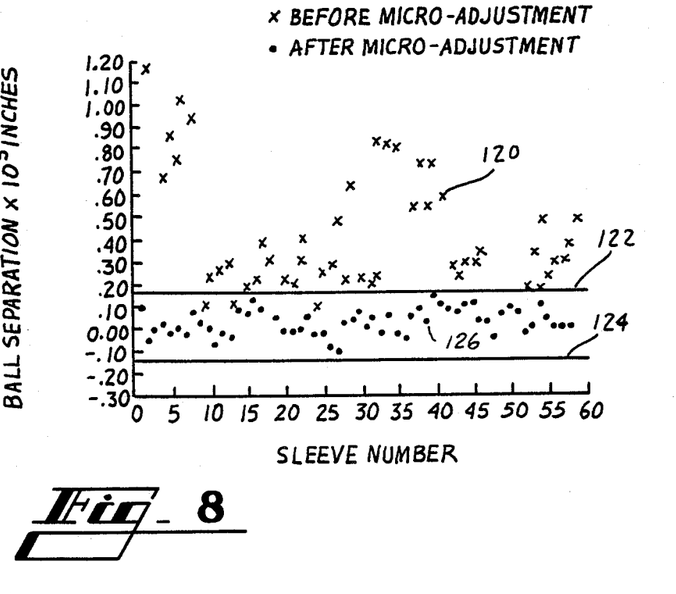
FIG. 8 shows ball separation characteristics for single mode biconic sleeves before and after adjustment.
Figure 9:
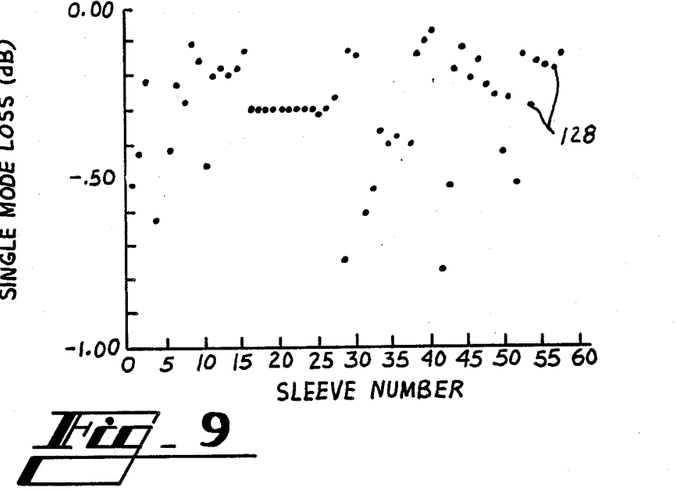
FIG. 9 shows a sampling of losses of biconic connections using molded sleeves which have been adjusted.

FIG. 8 is even more telltale of the results achieved by the methods and apparatus of this invention. In FIG. 8, points designated 120 and located above a horizontal line 122 show gauging ball separation of a number of sample sleeves 66—66 prior to the application of the methods of this invention. After the sleeves 66—66 have been adjusted, the range of ball separation is lowered substantially as is evidenced from the plotting of points 126—126 between the two horizontal lines 122 and 124. In FIG. 9, points 128—128 show the losses encountered with single mode fibers connected with sleeves 66—66 after the sleeves have been micro-adjusted in accordance with this invention.

Viewing now FIG. 10, there is shown an arrangement of a tool 130 which is used to adjust the taper length of a plug 24. The tool 130 includes a cavity 32 which is machined to have a precise truncated conical shape and which is faced with an abrasive material 134 such as that which is used to face the tool 100 of FIG. 5. A plug 24 having a less than required taper length is dipped in alcohol and inserted into the cavity 132 of the tool 130 and turned rotatably while a longitudinal force F is applied. This causes material to be removed from the surface of the plug and results in a longer taper length. It should be apparent that the tool 130 could comprise a sleeve 66 having cavity walls which have been faced with an abrasive material. Afterwards, the plug is cleaned and dried and polished as described with respect to the sleeve adjustment.

This last-mentioned technique facilitates the repair of damaged plug-terminated fibers. In the event that the fiber end in the secondary pedestal 36 becomes scratched inadvertently, the end of the pedestal is refinished which thereby reduces the taper length measurement. The required taper length is reachieved by inserting the plug 24 into a tool sleeve having its cavities lined with the abrasive material and turning rotatably the plug while applying a longitudinal force F thereto.

The adjustment of the plug 24 also causes removal of the sharp leading edge of the plug end portion 30. As a result, damage to the sleeve 66 during insertion is reduced substantially.

Figure 11A:
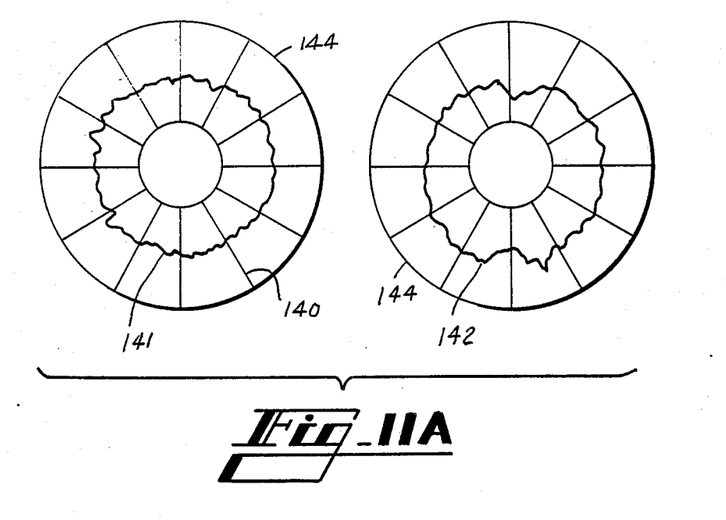
FIGS. 11A and 11B show circumferential profiles of a biconic plug and sleeve before and after adjustment.
Figure 11B:
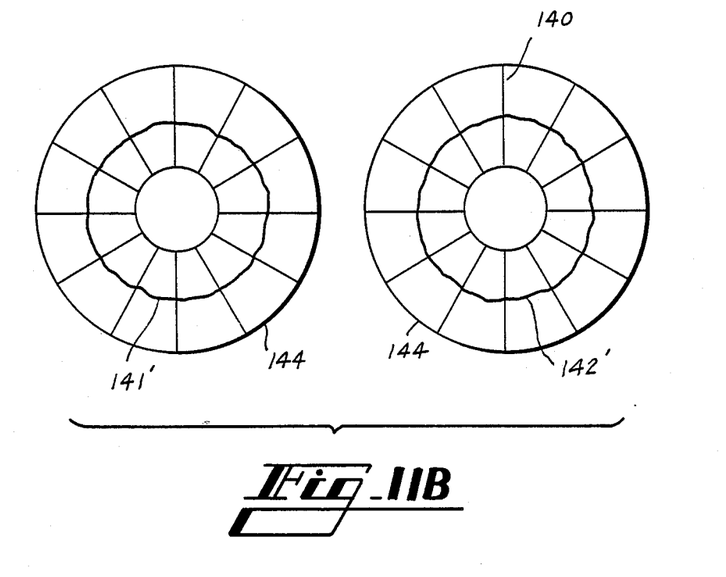

This technique improves the longitudinal surface profile of the plug and the roundness of its circumferential surface. The profiles shown in FIG. 7 also apply to plugs which are adjusted in accordance with this invention. The improvement in roundness of the sleeve cacity walls or of the plug conical surface is shown by comparing FIGS. 11A and 11B. Radial lines 140—140 shown in FIGS. 11A and 11B are provided for graphing purposes. FIG. 11A shows circumferential profiles 141 and 142 of a sleeve cavity wall or of a plug outer surface on charts 144—144 before adjustment and FIG. 11B shows their configurations 141' and 142' afterwards.

Figure 12:
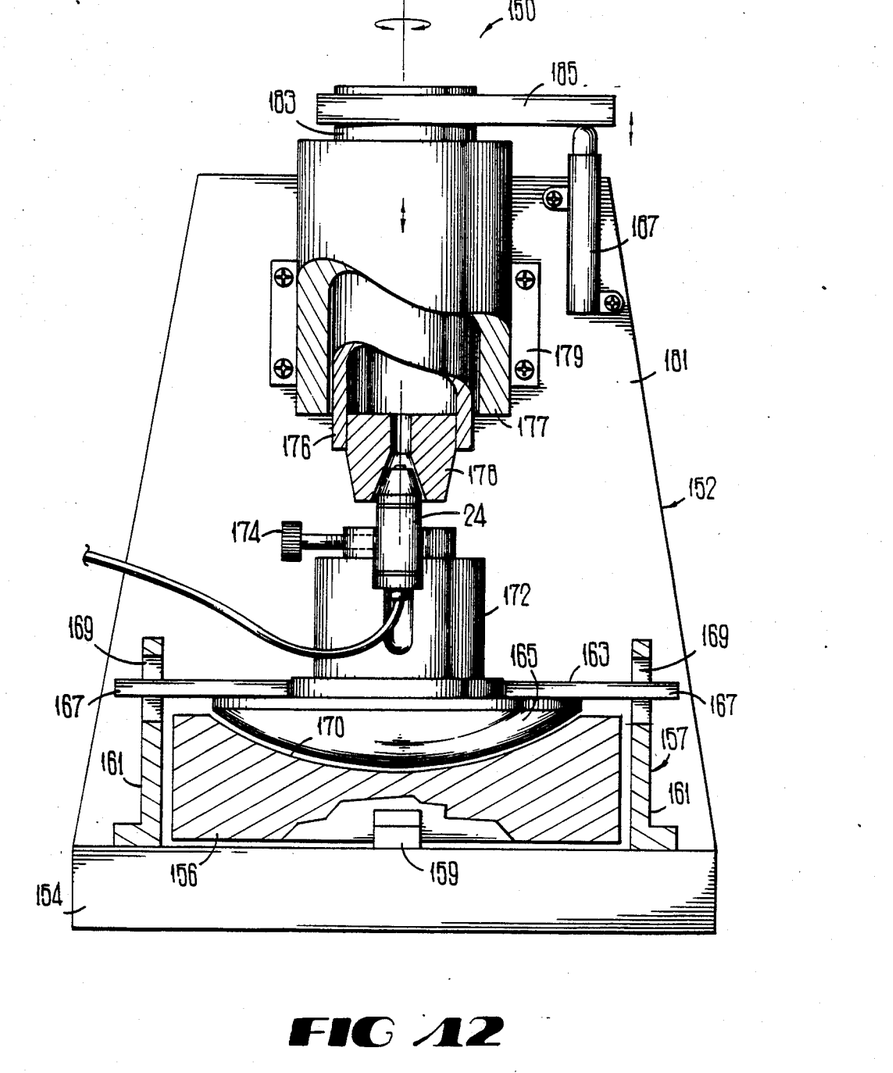

Depicted in FIG. 12 is an apparatus 150 which may be used to adjust sleeves or plugs which comprise a biconic connector system. As can be seen, the apparatus 150 includes a frame 152 which includes a base 154. Disposed above the base 154 is a platform 156 which is disposed with a guide 157. The guide 157 includes side retention members 159—159 and end posts 161—161 for limiting movement of the platform 156 therewithin. The platform 156 is adapted to float on a cushion of air between the platform and the top of the base. Spanning between the end posts 161—161 is a beam 163 to which is attached a partially spherical bearing 165. End portions 167—167 of the beam 163 extend through enlarged openings 169—169 in the posts 161—161. As a result, the bearing 165 is free to tilt under the support of a cushion of air between it and a curved surface 170 of the platform 156. Tilting of the platform 156 is limited by engagement of end portions of the beam with walls which define the openings in the posts.

Mounted on the beam 163 is a chuck 172 which is adapted to hold a plug 24 as a workpiece. A clamp 174 is adapted to hold the plug in the chuck 172. Disposed above the chuck 172 ia another chuck 176 which is disposed rotatably within an air spindle 177 and which is adapted to hold a sleeve-like tool 178. The spindle 177 is supported in a housing 179 which is mounted to a stanchion 181 of the frame 152. As is seen, the chuck 176 is adapted to be turned by a drive 183 and is adapted to be raised or lowered by engagement of a positioner arm 185 extending laterally thereof with a micropositioner 187. Feedback of the pressure between the platform and the base may be used to control the micropositioner to adjust the position of the workpiece relative to the tool.

It should be understood that the plug may be the tool with an abrasive material provided on the truncated conical shaped outer surface thereof. Or the sleeve 66 may be the tool and have its cavity faced with an abrasive. In the apparatus 150, the chuck 176 is rotated which causes the sleeve-like tool 178 as the tool to be rotated. This causes relative motion between the tool and the plug 24 which is held in the chuck 172 and which is to be adjusted.

On the other hand, the sleeve 66 may be held in the chuck 172 and a plug-like tool mounted in the chuck 176. In this instance, the plug-like tool is turned rotatably to abrade the cavities of the sleeve.

Also, because of the mounting of the plug 24 which may be the tool, the tool as it is inserted into the sleeve 66 adjusts so that the axis of the plug is parallel to that of the sleeve and aligned therewith. This is caused to occur because of the capability of the platform to move in an x–y plane and because of the capability of a predetermined amount of angular movement of the spherical bearing.

As should be apparent, the axis of rotation of the tool means, be it the sleeve or the plug is determined by and is coaxial with axis of revolution of the alignment surface to be abraded. Also, the axis of revolution of the alignment surface which is abraded by the tool means is maintained while the alignment surface is abraded by the tool means.

It is to be understood that the above-described arrangements are simply illustrative of the invention. Other arrangements may be devised by those skilled in the art which will embody the principles of the invention and fall within the scope and spirit thereof.

What is claimed is:

1. An apparatus for adjusting associated, conically shaped alignment surfaces of a sleeve and of two plugs which are used to cause the sleeve to hold the plugs and two fibers aligned coaxially with each other and to cause two fibers terminated by plugs seated in the sleeve to have a predetermined end separation, said apparatus including:

tool means including a truncated conically shaped surface which is provided with an abrasive material for abrading one of associated conically shaped alignment surfaces of a first conically shaped plug, which terminates an optical fiber, and of a wall, which defines one conically shaped cavity of a sleeve adapted to receive the first plug, and for abrading one of associated conically shaped alignment surfaces of a second truncated conically shaped plug, which terminates an optical fiber, and of a wall, which defines another conically shaped cavity of the sleeve opposed to said one cavity and adapted to receive the second plug, said tool means being such that relative motion about an axis of rotation thereof may be caused to occur between said tool means and each alignment surface, the truncated conically shaped surface of said tool means being defined by a diameter and by an angle between a longitudinal axis thereof and the truncated conically shaped surface relative to a diameter and a corresponding angle of an alignment surface which are such as to cause an end portion of the truncated conically shaped surface of each plug which is adapted to engage a wall of the sleeve to have a diameter which is greater than that of an opening between the opposed cavities, and disposed in a plane which is common to the opposed cavities, and to cause an angle between a longitudinal axis extending through the opposed cavities of the sleeve and a wall which defines a cavity of the sleeve to be greater than the angle between said longitudinal axis and a truncated surface of each plug; and means for causing relative motion between said tool means and each alignment surface about the axis of rotation to cause said tool means to abrade and remove material from one of each pair of alignment surfaces of the plugs and the sleeve while adjusting the distance between a reference circumference of one of the associated alignment surfaces of the first plug and sleeve to a reference circumference of one of the associated alignment surfaces of the second plug and sleeve to be a predetermined value which results in the fibers being aligned coaxially and having the predetermined end separation, said means for causing relative motion between said tool means and each alignment surface being such that the axis of rotation of said tool means is determined by and is coaxial with axes of revolution of the alignment surfaces to be abraded and such that the axes of revolution of the alignment surfaces which are abraded by said tool means are maintained while the alignment surfaces are abraded by said tool means.

2. The apparatus of claim 1, wherein the abrading is accomplished with said tool means which includes a lapping portion which is covered with an abrasive material and which is inserted into each cavity and turned rotatably, and wherein a lubricating material is disposed between said lapping portion and the cavity walls of the sleeve.

3. The apparatus of claim 2, wherein the lapping portion is configured so that when it is inserted into a cavity, it engages the wall which defines the cavity in the vicinity of and prior to reaching a transverse axis of the sleeve to cause the center of rotation of said lapping portion to be substantially coincident with a longitudinal axis of the sleeve at the center of a common plane between the cavities.

4. The apparatus of claim 1, which also includes means for applying forces to said lapping portion in a direction longitudinally of the sleeve.

5. The apparatus of claim 1, wherein abrading of outer surfaces of the plugs is accomplished with said tool means which includes an alignment sleeve having at least portions of its cavities faced with an abrasive material.

6. An apparatus for adjusting conically shaped alignment surfaces which define two opposed cavities of a sleeve which are used to hold two optical fiber terminating plugs aligned coaxially with each other and to cause the fibers to have a predetermined end separation with an end portion of each plug which engages an inner wall of the sleeve being spaced from a plane which is common to the opposed cavities of the sleeve, said apparatus including:

tool means including an axis of rotation and a truncated conically shaped surface which is provided with an abrasive material for abrading each of two opposed conically shaped alignment surfaces one of which defines one conically shaped cavity of a sleeve adapted to receive a first truncated conically shaped plug that terminates an optical fiber and another of which defines another conically shaped cavity of the sleeve adapted to receive a second truncated conically shaped plug that terminates an optical fiber with the two cavities being opposed to each other, said tool means being such that rotational motion about the axis of rotation of said tool means may be caused to occur, being such that an end portion of the truncated conically shaped surface of said tool means has a diameter which exceeds that of an opening between the two cavities and lying in a plane common to each of said cavities, and being such that an angle between the axis of rotation of said tool means and the outer truncated surface thereof is less than that between an axis of the sleeve which extends through the two cavities and each truncated shaped alignment surface of the sleeve; and means for causing said tool means to be turned rotatably about its axis of rotation while being disposed in each said cavity to cause said tool means to abrade and remove material from each alignment surface of the sleeve such that an end portion of each plug seated in a cavity of the sleeve is spaced from the common plane while adjusting the distance between a reference circumference of one of the associated alignment surfaces of the sleeve to a reference circumference of the other one of the associated alignment surfaces to be a predetermined value which results in the fibers terminated by the plugs being aligned coaxially and having the predetermined end separation, said means for causing said tool means to be turned rotatably being such that the axis of rotation of said tool means is determined by and is coaxial with axes of revolution of the alignment surfaces to be abraded and such that the axes of revolution of the alignment surfaces which are abraded by said tools means are maintained while the alignment surfaces are abraded by said tool means.

* * * * *